(12) United States Patent
Todd

(10) Patent No.: US 6,463,418 B1
(45) Date of Patent: *Oct. 8, 2002

(54) SECURE AND STATEFUL ELECTRONIC BUSINESS TRANSACTION SYSTEM

(75) Inventor: James W. Todd, Sunnyvale, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,957

(22) Filed: Aug. 20, 1997

Related U.S. Application Data

(63) Continuation-in-part of application No. 08/912,206, filed on Aug. 15, 1997.

(51) Int. Cl.⁷ .......................... G06F 17/60; H04K 1/00; H04L 9/00
(52) U.S. Cl. .............. 705/26; 705/27; 705/51; 705/52
(58) Field of Search ............. 705/26, 27, 51, 705/52

(56) References Cited

U.S. PATENT DOCUMENTS

| | | | | |
|---|---|---|---|---|
| 4,799,156 A | * | 1/1989 | Shavit et al. ............... 364/401 |
| 5,297,208 A | * | 3/1994 | Schlafly et al. ............ 380/261 |
| 5,548,645 A | * | 8/1996 | Ananda ........................ 705/52 |
| 5,559,888 A | * | 9/1996 | Jain et al. .................... 713/166 |
| 5,657,390 A | * | 8/1997 | Elgamal et al. ............ 713/151 |
| 5,699,526 A | * | 12/1997 | Siefert ........................ 395/227 |
| 5,708,780 A |  | 1/1998 | Levergood et al. ......... 395/200 |
| 5,715,314 A |  | 2/1998 | Payne et al. .................. 380/24 |
| 5,724,424 A |  | 3/1998 | Gifford ........................ 380/24 |
| 5,729,594 A | * | 3/1998 | Klingman ................. 379/93.12 |
| 5,734,719 A | * | 3/1998 | Tsevdos et al. ............. 700/234 |
| 5,757,917 A | * | 5/1998 | Rose et al. ..................... 380/25 |
| 5,768,503 A | * | 6/1998 | Olkin .......................... 713/201 |
| 5,793,972 A | * | 8/1998 | Shane .................... 395/200.49 |
| 5,809,144 A | * | 9/1998 | Sirbu et al. .................... 380/25 |
| 5,845,265 A | * | 12/1998 | Woolston ..................... 705/37 |
| 5,872,850 A | * | 2/1999 | Klein et al. .................... 705/51 |
| 5,889,860 A | * | 3/1999 | Eller et al. ..................... 705/51 |
| 5,903,652 A | * | 5/1999 | Mital .......................... 705/58 |
| 5,910,897 A | * | 6/1999 | Ginter et al. ................. 705/52 |
| 5,918,013 A | * | 6/1999 | Mighdoll et al. ........... 709/217 |
| 5,944,794 A | * | 8/1999 | Okamoto et al. ........... 709/225 |
| 6,000,030 A | * | 12/1999 | Steinberg et al. ........... 713/200 |
| 6,021,198 A | * | 2/2000 | Anigbogu et al. .......... 380/269 |
| 6,041,316 A | * | 3/2000 | Allen .......................... 705/52 |
| 6,073,124 A | * | 6/2000 | Krishnan et al. ............. 705/59 |
| 6,182,052 B1 | * | 1/2001 | Fulton et al. ................. 705/26 |
| 6,195,646 B1 | * | 2/2001 | Grosl et al. ................... 705/26 |

FOREIGN PATENT DOCUMENTS

| WO | WO-94/00936 A1 | * | 1/1994 |
|---|---|---|---|
| WO | WO-97/08868 A1 | * | 3/1997 |

OTHER PUBLICATIONS

Hickman, A., "Remotely Possible/DIAL," PC MAgazine, vol. 13, No. 14, p. 307, Aug. 1994.*

(List continued on next page.)

Primary Examiner—Wynn Coggins
Assistant Examiner—Nicholas David Rosen
(74) Attorney, Agent, or Firm—Skjerven Morrill LLP

(57) ABSTRACT

A method for transacting business electronically includes storing first information in a database management module, reading the first information in the database management module by a network server module, providing a client customized interface with the first information by the network server module, providing client information and product information to a file transfer module responsive to a client ordering a product, and transferring a product to a client by the file transfer module.

22 Claims, 9 Drawing Sheets

OTHER PUBLICATIONS

Anon., "Compuserve Sets Course for the Internet," M2 Presswire, Sep. 19, 1994.*

Anon., "IBM Digital Library to Ship EMI Music Clips to Ad–Men," Computergram International, No. 2695, Jun. 29, 1995.*

Guenther, K., "Inside the Internet," Office Systems, vol. 13, No. 11, pp. 48–51, Nov. 1996.*

Schneier, B., Applied Cryptography, Second Edition, John Wiley & Sons, Inc., 1996, pp. 567–569.*

Anon., "Temporary Global Passwords," IBM Technical Disclosure Bulletin, vol. 36, No. 3, pp. 451–453, Mar. 1993.*

* cited by examiner

SECURE AND STATEFUL ELECTRONIC BUSINESS TRANSACTION SYSTEM

CROSS-REFERENCE TO RELATED APPLICATIONS

This application is a continuation-in-part of copending U.S. application Ser. No. 08/912,206, filed Aug. 15, 1997, entitled "Secure and Stateful Electronic Business Transaction System," naming James W. Todd as inventor.

BACKGROUND

1. Field of the Invention

The present invention relates to computer systems and networks of computer systems, and, more particularly, to a system of conducting transactions over a network of computer systems in a secure manner.

2. Description of the Related Art

Computer systems are information handling systems which can be designed to give independent computing power to one user or a plurality of users. Computer systems may be found in many forms including mainframes, minicomputers, workstations, servers, personal computers, Internet terminals and notebooks. A computer system often includes multiple computer processes executing on the same computer system at the same time. Computer systems are often coupled to other computer systems to form a network to facilitate the exchange and handling of information. A computer network is a group of computer systems and associated hardware devices (e.g., physical connections) and software applications (e.g., communications protocol programs and data).

A network of computer systems may include multiple computer processes executing on multiple computer systems as if the multiple computer systems were a combined resource to the computer processes. Consequently, it often makes sense to discuss computer processes instead of, or in addition to, computer systems when discussing interaction over a computer network. For example, a web server can be considered to be a computer system, but it is often more accurate to describe the web server as a computer process running on a computer system. A computer system including a web server process typically includes other computer processes as well. Also, a database server can be a computer process that includes management software and information files that reside on one or several computer systems or computer servers.

A network can involve permanent connections, such as cables, or temporary connections made through telephone or other communications links. A network can be as small as a local area network (LAN) consisting of a few computers, printers, and other devices, or it can consist of many computers of various types distributed over a vast geographic area (e.g., a wide area network, or WAN). Similarly, a computer network can be an intranet (internal to a defined user entity) or an internet. An internet is a set of possibly dissimilar computer networks joined together by means of gateways or bridges. A gateway handles data transfer and conversion of messages from a sending network to the protocols used by a receiving network, if necessary. Also, the term "Internet" more specifically refers to the collection of networks and gateways that use the TCP/IP (Transport Control Protocol/Interface Program) suite of protocols. When used in this more specific manner, the term is often capitalized.

Interaction over the Internet occurs in many different ways. For example, computer system users on the Internet can communicate via electronic mail, network news and newsgroups, so-called "chat rooms" and real-time exchange of video and audio. Users may also locate and access information across the internet using various interaction protocols including the network terminal protocol (telnet), the file transfer protocol (FTP), Gopher and search engines such as Wide Area Information Service (WAIS), to name only a few. An increasingly popular medium for communication over the Internet is the World Wide Web.

The World Wide Web (WWW, or the Web) includes interaction between Internet users via request and distribution of hypertext documents or web pages. Interaction on the World Wide Web is performed according to the HyperText Transfer Protocol (HTTP) and HTTP client-server interactions. HTTP servers are designed specifically to distribute hypertext documents by way of a request and response dynamic with client applications such as web browsers, web robots or proxy servers. Internet resources are addressed on the World Wide Web by uniform resource locators (URLs). A web page may be accessed by directing a computer system to access a particular URL. Web pages are written in the HyperText Markup Language (HTML). HTML allows the creation of hypertext links to other Web resources, fill-in forms, feedback email, etc., by referencing other URLs. The JAVA programming language can be used to extend the capabilities of the HTTP by interacting with a runtime interpreter on the computer system of the web browser to provide features such as animation. The JAVA language and related packages also enable the assemblage of dynamic content by accessing local and/or remote data and application sources independent of platform from the HTTP server.

Web users can utilize several different means of communication over the Internet depending on the capabilities of the user's web browser. A web browser can support some or all of the above mentioned Internet communication techniques in addition to the HyperText Transfer Protocol. Furthermore, portions of the Web can be internal to a defined user entity and protected by various security protocols so that external users cannot access such private portions of the Web.

Server-side resource processing allows a user with a Web browser to interact with resources on an HTTP server computer system by providing a tunnel through the server to these resources. This can be either through the common gateway interface (CGI), or through special modules built into the server. The common gateway interface is the interface between an HTTP server (the program that serves the pages for a Web site) and the other resources of the server's host computer system. CGI is a set of commonly named variables and conventions for passing information from the client to the server to the server system and back again.

The file transfer protocol (FTP) is another commonly known and widely used method of communication over the Internet. FTP is a method of copying binary and ASCII (American Standard Code for Information Interchange) files between computer systems connected via the Internet. FTP allows files of any type to be copied regardless of the types of computer systems connected or operating systems being used as long as both computer systems understand the FTP. Although FTP commands are usually the same, there may be some variations from one FTP implementation to the next. Like HTTP, FTP uses a client-server model. The server side is implemented by a daemon process typically referred to as either FTPD or IN.FTPD, and the client side is implemented by an FTP program. In operation, a client FTP program sends a control connection request to a server requesting either files or information regarding the files which are stored on the FTP server. The server provides the file to the client responsive to the request if the connection request is granted. FTP is supported by many versions of HTTP daemons (HTTPDs) and thus is executable via the World Wide Web.

Interaction with databases via the Internet is becoming more common as more powerful computer systems, cheaper storage and faster communication technologies are developed, and as companies and customer bases become geographically separated. One powerful type of database system is the relational database management system (RDBMS) which is a system for storing and retrieving data in which the data is represented in two-dimensional tables or relations. A relational database includes a collection of such tables that store interrelated data. Each table in the database holds information about different data points, but some information in each table overlaps with information in another table. Columns that appear in more than one table and that link the tables together are called keys. Keys allow retrieval of information that is distributed over multiple tables.

A powerful query language called the Structured Query Language (SQL) is a commonly used language for seeking and selecting data from a database. SQL enables users to construct precise, complex query statements to search a database and to return data that matches the search restraints. One type of database system which uses such a SQL is the Sybase SQL Server 11 which is available from Sybase, Inc. of Emeryville, Calif. Another common type of database system is the Oracle database system which is available from Oracle Corporation of Redwood Shores, Calif.

Increasingly, the Internet is being used as a medium for commercial transactions. Internet commerce is the capability to buy and sell goods and services using the Internet. Often, orders are placed over the Internet but payment and shipping occurs "offline," but a primary advantage of using Internet commerce is that information and digital products may be inexpensively distributed via the Internet. Shareware, for example, has been available for many years for free or for a small price.

The use of the Internet for commercial transactions has raised many concerns regarding security and privacy. Especially, for example, regarding the transmission of credit card numbers and the susceptibility of data transmissions to interception by criminal hackers. In a secure WWW environment, a web server employs various access control protections and the web browser is a secure browser capable of encryption and decryption. "Cleartext" information is encrypted into "ciphertext" prior to transmission; upon receipt of the ciphertext, the receiving computer system decrypts the ciphertext into the original cleartext. Thus, any data that is intercepted is worthless because of the encryption. Various encryption algorithms used to encrypt information are publicly available and include RC4 and MD5. RC4 is a variable-key-size stream cipher which is used in many commercial cryptography products. MD5 (Message Digest 5) is a one-way hash function which produces a 128-bit hash, or message digest, of the input message. RC4 and MD5 are well known in the art.

SUMMARY

In one embodiment of the invention, a method for transacting business electronically includes storing first information in a database management module, reading the first information in the database management module by a network server module, providing a client customized interface with the first information by the network server module, providing client information and product information to a file transfer module responsive to a client ordering a product, and transferring a product to a client by the file transfer module.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following sets forth a detailed description of one embodiment of the invention. The description is intended to be illustrative of the invention and should not be taken to be limiting. Other embodiments of the invention may include variations, modifications, additions, and improvements that fall within the scope of the invention as defined by the claims that follow.

In one embodiment of the invention, a stateful and secure electronic business transaction system (EBTS) is provided by a computer network. Dynamic access to a relational database management system (RDBMS) is provided over the Internet for external customers and over the Internet or an intranet for internal customers. An external web server interfaces with external or internal users and an internal RDBMS. An external file transfer server provides security for transactions between external users and the RDBMS. An internal web server interfaces with internal users and the internal RDBMS.

Figure 1A:
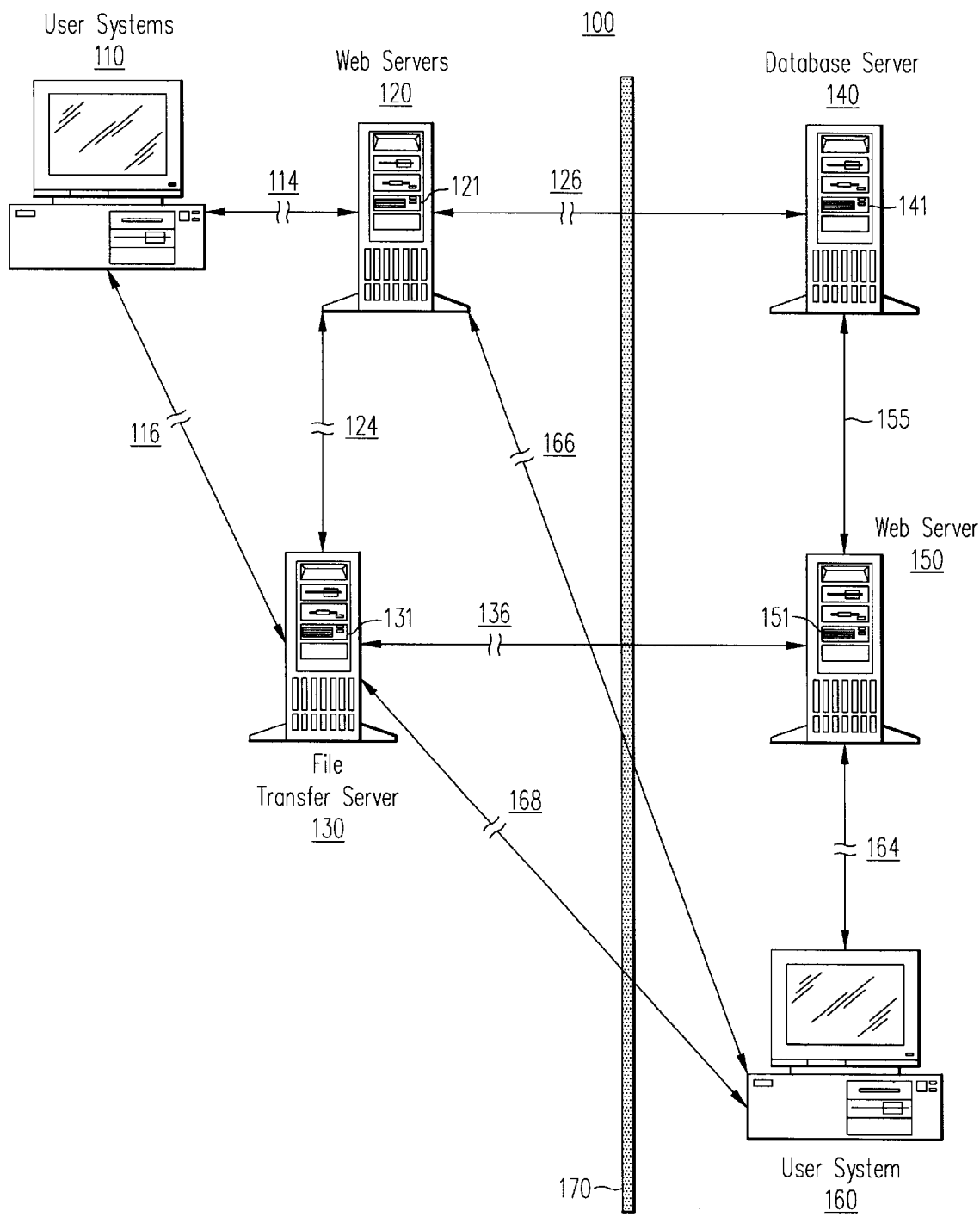
FIGS. 1A and 1B show block diagrams of an exemplary network of computer systems and processes according to an embodiment of the invention.
Figure 1B:
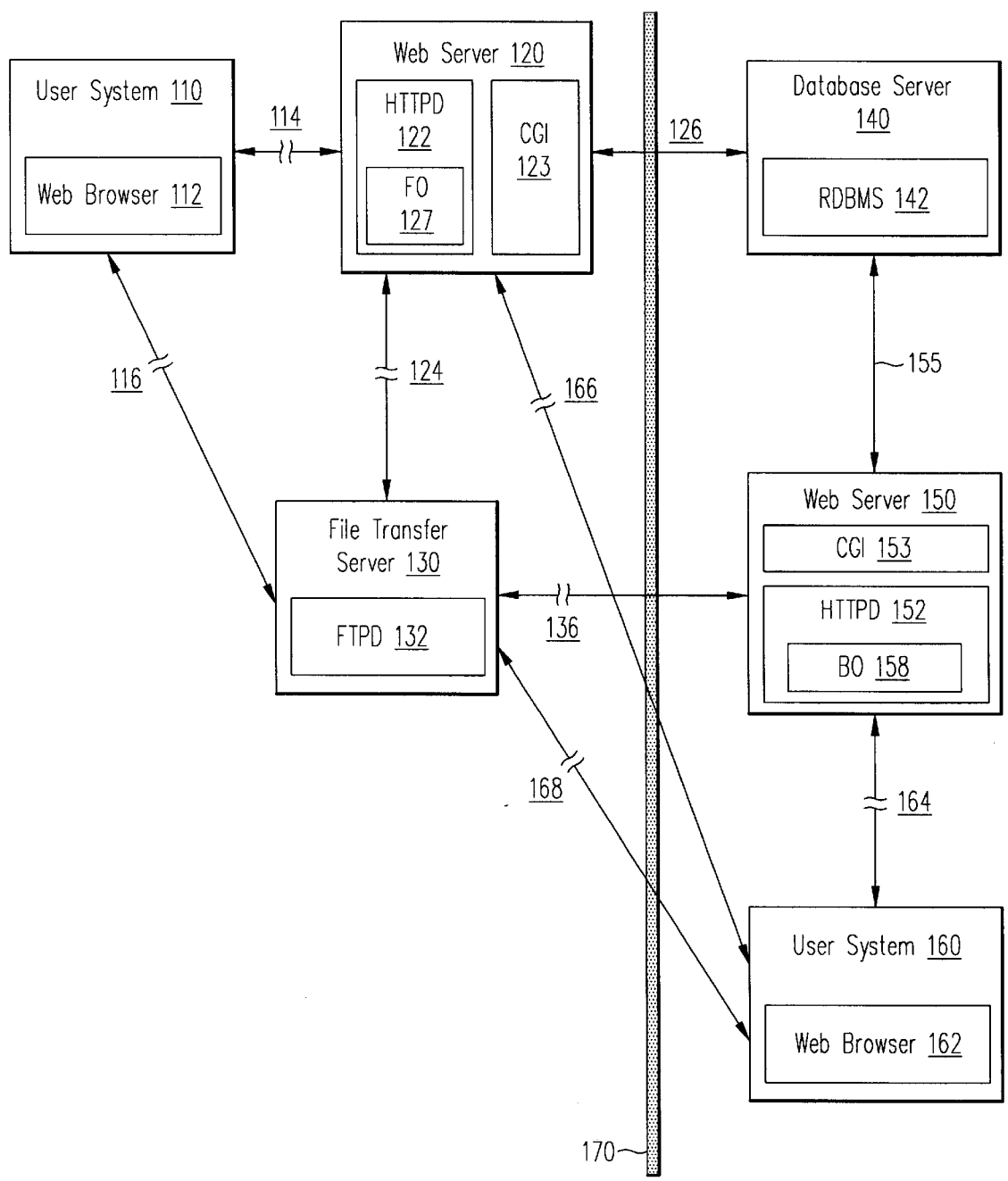

FIGS. 1A and 1B depict an exemplary computer network 100 in accordance with an embodiment of the invention.

FIG. 1A depicts the computer systems included in computer network 100. FIG. 1B depicts the computer systems of FIG. 1A and the computer processes of the computer systems of FIG. 1A included in computer network 100. In the embodiment of FIG. 1B, the computer processes reside on certain computer systems and are of specific types as indicated. It is understood that in other embodiments of the invention, different types of computer processes residing on the same, other or combinations of the same or other computer systems may be used so long as the overall functionality of the EBTS is performed as claimed hereinafter.

Referring to FIG. 1A, computer network 100 includes various computer systems coupled over various network connections. For example, computer network 100 includes user system 110, web server 120, file transfer server 130, database server 140, web server 150 and user system 160. Firewall 170 separates computer systems 110, 120 and 130 from computer systems 140, 150 and 160. Computer systems 110, 120 and 130 are on an external side of firewall 170 and are accessible via the Internet. Computer systems 140, 150 and 160 are on an internal side of firewall 170. Computer systems 120, 130, 140 and 150 include storage 121, 131, 141 and 151, respectively.

Computer systems 110–160 may be of any type of computer system appropriate for the function served by each of computer systems 110–160. For example, user systems 110 and 160 may be of any type of computer system capable of interacting over an internet by modem or other network connection, such as most personal computer systems. Web servers 120 and 150 can be any type of computer system capable of providing web server functionality, such as the Sun WebServer, Netscape Communication and Commerce Servers and the Java Web Server. File transfer server 130 can be any type of computer system capable of file transfer protocol functionality, such as the file transfer protocol daemon Solaris 2.x/SPARC. Database server 140 can be any type of computer system capable of providing a database system compatible with an embodiment of the invention, such as the Sybase SQL Server or Oracle relational database management systems.

Computer systems 110–160 are coupled via various connections. Computer system 110 is coupled to computer system 120 via connection 114. Computer system 110 is coupled to computer system 130 via connection 116. Computer system 120 is coupled to computer system 130 via connection 124. Computer system 120 is coupled to computer system 140 via connection 126 through firewall 170. Computer system 140 is coupled to computer system 150 via connection 155. Computer system 150 is coupled to computer system 160 via connection 164. Computer system 130 is coupled to computer system 150 via connection 136. Computer system 160 is coupled to computer system 120 via connection 166. Computer system 160 is coupled to computer system 130 via connection 168.

Some or all of connections 114, 116, 124, 126, 136, 155, 164, 166, 168 may be internet connections or other types of connections such as "direct" phone line connections or FDDI or Ethernet connections. Some or all of connections 114, 116, 124, 126, 136, 155, 164, 166, 168 may be permanent connections or may occur only during specific time periods. In the preferred embodiment, connections 114, 116, 124, 136, 164, 166 and 168 are Internet type connections, and connections 126 and 155 are connections such as Ethernet or FDDI connections. Connection 164 is an Internet type connection (TCP/IP) but may be characterized as an intranet connection because it is internal to firewall 170.

Referring to FIG. 1B, user systems 110 and 160 provide terminals to users or customers or clients for accessing the EBTS. Specifically, user system 110 provides a terminal for external users (customers outside the firewall 170), and user system 160 provides a terminal for internal users (customers inside firewall 170). User systems 110 and 160 each include a client network process or module for interacting with other computer processes on other computer systems via internet connections. In the embodiment of FIG. 1B, the client network processes of user systems 110 and 160 are web browsers 112 and 162, respectively. Each customer desiring to try products, order products, receive information or update information uses a client network process such as web browsers 112 or 162 on their user system to access the EBTS via a web server such as web servers 120 or 150. Any number of user systems may be coupled to the web servers in addition to user systems 110 and 160.

Web servers 120 and 150 each include a network server process or module for interacting with other computer processes on other computer systems via internet connections. In the embodiment of FIG. 1, the network server processes of web servers 120 and 150 are HTTP daemons (HTTPDs) 122 and 152, respectively. External HTTPD module 122 includes a Netscape Commerce Server which provides a "front office" (FO 127) server process and provides for the distribution of both non-secure and secure (Secure Socket Layer (SSL) protected) information. SSL is an open protocol for securing data communications across computer networks by providing encryption and authentication, and ensuring message integrity. Internal HTTPD module 152 includes a Netscape Communications Server which provides a "back office" (BO 158) server process and provides for the distribution of non-secure information. Back office 158 provides data access to privileged users. Front office 127 provides the same service.

Transaction information is maintained on web server 120 by including encrypted information in the URLs. Once encoded, transaction information allows for pages of subsequent visits to incorporate dynamic and pertinent data to the accessing customer at that precise point in time, thereby providing a stateful environment. A stateful web environment is one that can produce pertinent, personalized and relevant transactional content based on information provided to the HTTP server and data retrieved from a database, each of which are processed and validated by business applications systems. In the preferred embodiment, the encryption algorithms used by the stateful engine of the EBTS are based on publicly available algorithms such as RC4 and MD5. Variations on these cryptographic algorithms may be used or other cryptographic algorithms may be used in accordance with the invention. These and other cryptographic algorithms are known in the art. See, for example, B. Schneier, "Applied Cryptography," (Jon Wiley & Sons, Inc. 2d ed. 1996).

Each of web servers 120 and 150 also include a server-side resource process for interacting with various computer resources at the behest of the corresponding HTTPD. In the embodiment of FIG. 1, the server-side resource processes of web servers 120 and 150 are common gateway interfaces (CGIs) 123 and 153 for servicing requests relayed by HTTPDs 122 and 162, respectively. For example, a CGI can receive login request information, access the corresponding customer information in RDBMS 142, and provide the corresponding customer information to the requesting HTTPD for transmittal to the requesting user system. In this way, a customized order interface can be presented to the logged in customer. In one embodiment, the CGI application is implemented in Sybtcl 2.4 which is a flexible scripting language used to provide database access.

In another embodiment, a server-side JAVA process may be used alone or in combination with CGI to partition and segment services. With Java, it is possible to segment a business application to form three tiers: client(s), server(s), and database server(s). The JAVA process may include a JAVA database connectivity (JDBC) module to allow access to databases independent of each database type and a remote method invocation (RMI) module to allow interaction independent of client/server process types. Furthermore, each tier may be segmented such that each tier has several, individually accessible subsystems. For example, the server tier may include HTTP servers, application servers and remote method invocation modules.

File transfer server 130 includes a file transfer process for interacting with other computer processes on other computer systems via internet connections. In the embodiment of FIG. 1, the file transfer process of file transfer server 130 is FTP daemon (FTPD) 132 which provides a file transfer protocol for transferring files from file transfer server 130 to user systems 110 and 160. File transfer server 130 includes storage for storing software products which are transferred to user systems 110 or 160 via respective connections 116 and 168 using the file transfer protocol of FTPD 132. When a client completes an order for a product, the client accesses a hypertext link which accesses the file transfer server's URL. FTPD then forwards the product to the client.

In the present embodiment, FTPD 132 is a secure FTP server engine which includes portions of standard FTP source code and RDBMS transaction lookup and verification processes. Much of the interactive and informative functionality of traditional FTP systems is not included in the secure FTP server implementation. Only secure and authenticated file access is granted by the secure FTPD. The secure FTP server engine uses a "ticket" (i.e., a password or set of passwords that function for a set amount of time) which is provided via the web server to determine whether to grant access to file transfer server 130. Database server 140 includes ticketing tables to control and manage product access and distribution. Also, the FTPD may track content access and distribution.

Database server 140 includes a database system for storing customer and/or product information. In the embodiment of FIG. 1B, the database system of database server 140 is RDBMS 142. RDBMS 142 stores customer and/or product information of the EBTS. RDBMS 142 includes Sybase SQL Server 11. Front office and back office servers 127, 158 interact with the RDBMS server (and file transfer server 130) via CGI (common gateway interface) scripts. The RDBMS server provides a foundation for the EBTS robust data collection and distribution engine.

Database server 140 may include one or more databases incorporating one or more tables in each. The data stored on database server 140 may be segmented or stored in various database structures while still allowing access to relevant data by multiple applications. The information stored in RDBMS 142 allows the EBTS to include a customized product order interface to external users (customers outside the firewall) who access web server 120 via user system 110. A similarly customized product order interface is provided to internal users (customers inside the firewall) who access web server 150 via user system 160. Database server 140 may reside on a single computer system or may be distributed among several computer systems.

In the present embodiment, database server 140 includes a secure FTP product description table which stores information regarding product name, version and directory name on FTPD server. Database server 140 further includes tables for storing information regarding secure FTP ticket/sequence transactions to control approved product access and distribution. Database server 140 further includes a customer registry table including fields for storing information identifying each customer. For example, geographic information, customer IDs and passwords, names, addresses (physical and email) and phone numbers. Various fields are included to describe the customer type and preferences, and the capabilities available to the customer on user systems 110, 160. Previous transaction information is also included. Any other information describing the customer may be included. For example, a salutation may be included. Any type of information may be stored in database server 140.

Referring to FIG. 1B, on the external or Internet side of firewall 170, internet connection 114, web browser 112 and HTTPD 122 provide a public web interface between user system 110 and web server 120. Internet connection 116, web browser 112 and FTPD 132 provide a public FTP interface between user system 110 and file transfer server 130. Thus, web browser 112 provides both HTTP access to web server 120 and FTP access to file transfer server 130. Other types of client network processes may be used to provide similar access to servers 120 and 150. Internet connection 124, HTTPD 122 and FTPD 132 provide an interface for transferring secure FTP authentication information between web server 120 and file transfer server 130 regarding the transactions between user system 110 and web server 120.

Internal web browser 162 may access RDBMS 142 via internal web server 150 and/or external web server 120. Intranet connection 164, web browser 162 and HTTPD 152 provide a private web interface between internal user system 160 and internal web server 150. Internet connection 166, web browser 162 and HTTPD 122 provide a public web interface between internal user system 110 and external web server 120. Users of internal user system 160 do not need the secure FTP of file transfer server 130 because user system 160 is inside firewall 170 and is already secure.

Database server 140 is coupled to provide customer and/or product information to web servers 120 and 150. Connection 126 and CGI 123 provide an RDBMS interface between HTTPD 122 and RDBMS 142 for internal and external users. Connection 155 and CGI 153 provide an RDBMS interface between HTTPD 152 and RDBMS 142 for internal users. Maintaining the database behind firewall 170 provides for timely information access and update in addition to data replication to backup and reporting systems.

Confidential customer and/or product information in RDBMS 142 is protected by firewall 170. For customers inside firewall 170, web browser 162 accesses RDBMS 142 via either HTTPD 122 or HTTPD 152. HTTPD 122 is encryption capable to protect confidential customer information being transferred between web server 120 and user systems 110 and 160. FTPD 132 provides a secure file transfer protocol for transferring customer and/or product information from file transfer server 130 to user systems 110 and 160. Thus, sensitive information is either protected by firewall 170, FTPD 132 or encryption modules of web server 120.

In operation, web browser 112 accesses HTTPD 122. HTTPD 122 accesses RDBMS 142 to provide a customized interface to each customer web browser 112. Specifically, a user provides encoded login information to HTTPD 122 which in turn provides the information to RDBMS 142 via CGI process 123 which decodes the information. Login verification information is transferred from RDBMS 142 to HTTPD 122 which compares the login information with the login verification information to verify and login the customer. Once logged in, the user may select a product to download by sending a message to HTTPD 122. When a product is ordered, a license is accepted. The license acceptance is tracked for each customer. When the license is accepted, a notice is sent to the FTPD 132 to provide the product to the user.

Figure 2:
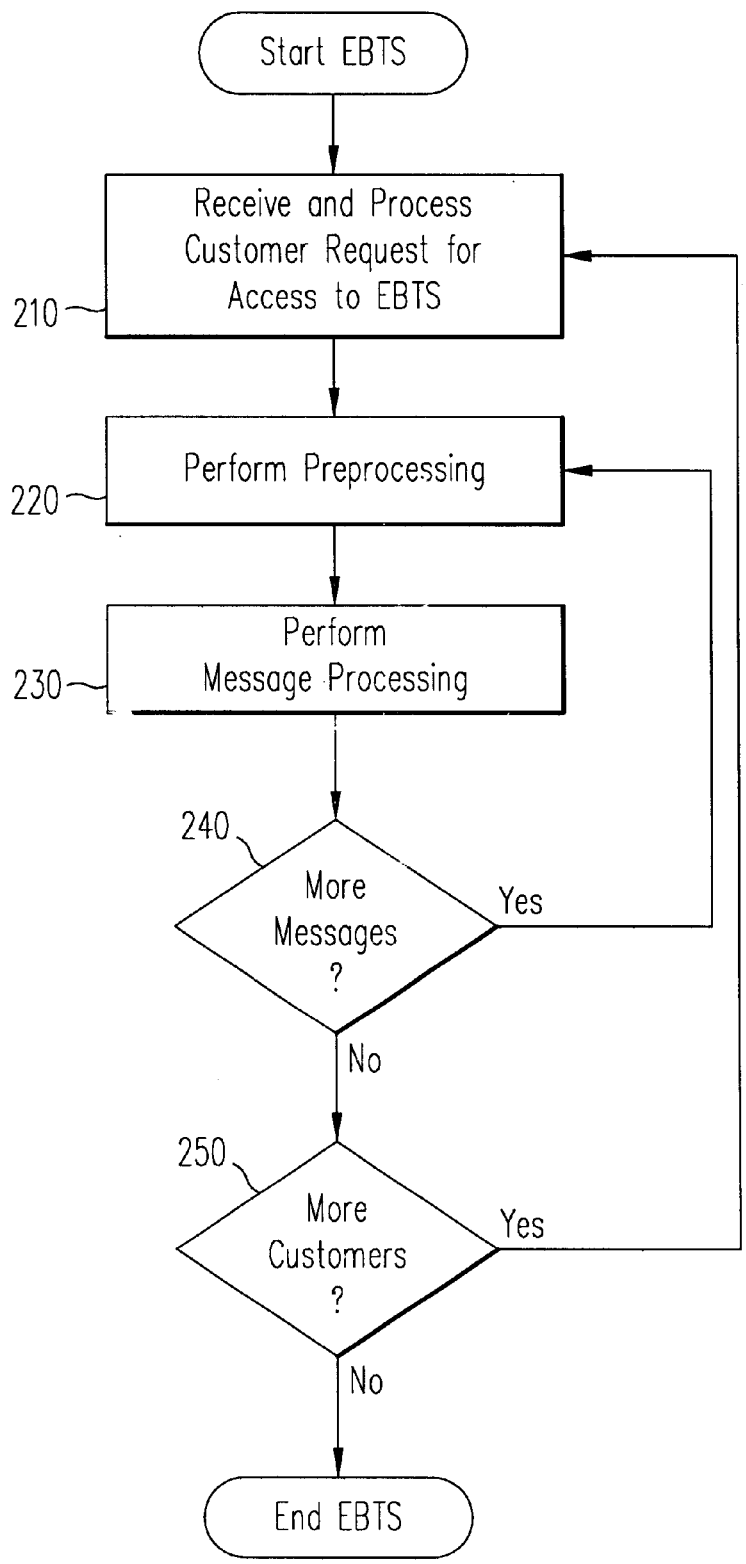
FIG. 2 shows a flow chart of an electronic business transaction module according to an embodiment of the invention.

Referring to FIG. 2, the primary modules of the present embodiment are shown. For demonstration, the modules will be discussed in sequence as they would be encountered by a message being processed by the EBTS in accordance with the shown embodiment. It is understood, however, that the modules could be operating at the same time with different messages or otherwise as claimed.

The modules discussed herein may be executed on computer systems configured to execute the modules and/or may be executed from a computer-readable storage medium. Although some modules may include steps executed by application specific hardware modules, the preferred embodiment includes steps executed by software modules executed on configured computer systems. The steps referred to herein may be modules or portions of modules. Furthermore, it is appreciated that the software modules discussed herein may include script, batch or other executable files, or combinations and/or portions of such files.

Software modules discussed herein may be stored on machine-readable or computer-readable storage media such as storage 121, 131, 141, 151 of computer systems 120, 130, 140, 150. (See FIG. 1A.) Storage 121 may be a magnetic floppy or hard disk or an optical disk such as CD-ROM (compact disk read only memory), CD-R (CD-recordable) or DVD (digital versatile/video disk), for example. Storage 121 may be a tape drive. Storage 121 may include a semiconductor-based memory module such as a FLASH memory, read only memory (ROM), erasable programmable ROM (EPROM), electrically erasable PROM (EEPROM), random access memory (RAM) or some other programmable array, and may be permanently, removably or remotely coupled to computer system 120. Storage 131, 141 and 151 are similarly provided. Thus, the software modules may be stored within a computer system memory to configure the computer system to perform the functions of the module. Other new and various types of computer-readable storage media may be used to store the software modules discussed herein.

Referring again to FIG. 2, at receive step 210, the EBTS receives customer requests to access the system at web server 120. The customer request is processed according to the procedure shown in FIG. 3 and described hereinafter. Control then transitions to preprocessing step 220. During preprocessing step 220, various preprocessing steps are performed such as system and message validation. The preprocessing procedure is shown in FIG. 4 and is described hereinafter. Control then transitions to perform message processing step 230. During perform message processing step 230, various message processing steps are performed. The message processing procedure is shown in FIGS. 5–8 and is described hereinafter. As shown in step 240, if there are more messages from the client, modules 220 and 230 are applied to the next message. Also, as shown in step 250, if there are more client messages, modules 210, 220 and 230 are applied to the next client and the next client's messages.

Figure 3:
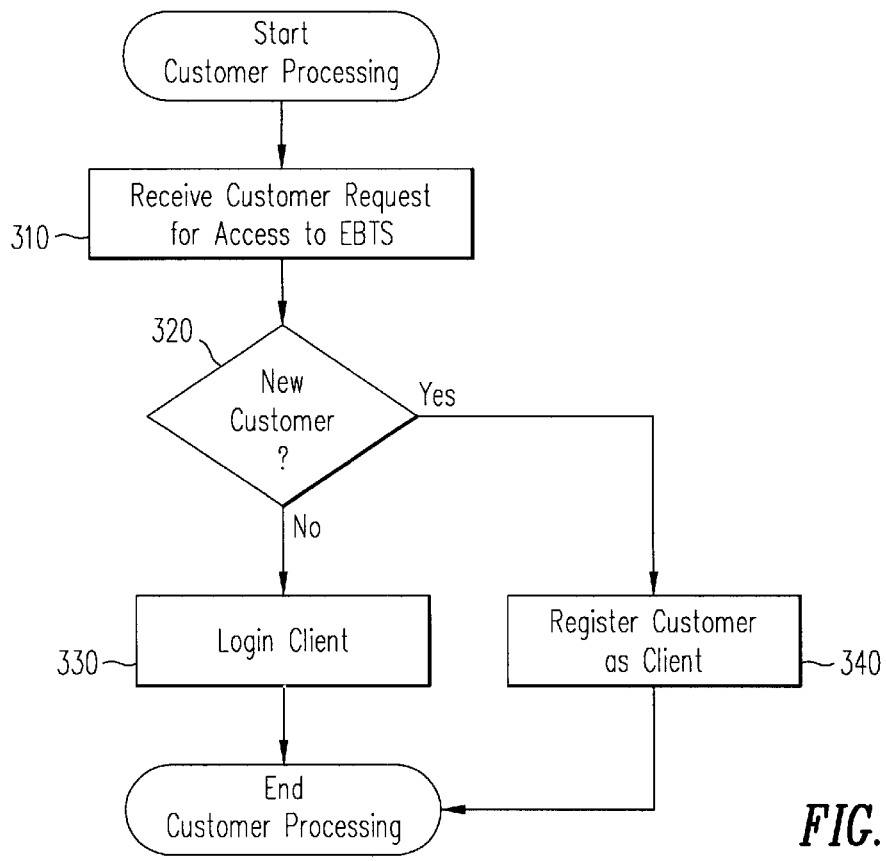
FIG. 3 shows a flow chart of an embodiment of a registration and login module of an electronic business transaction module according to an embodiment of the invention.
Figure 4:
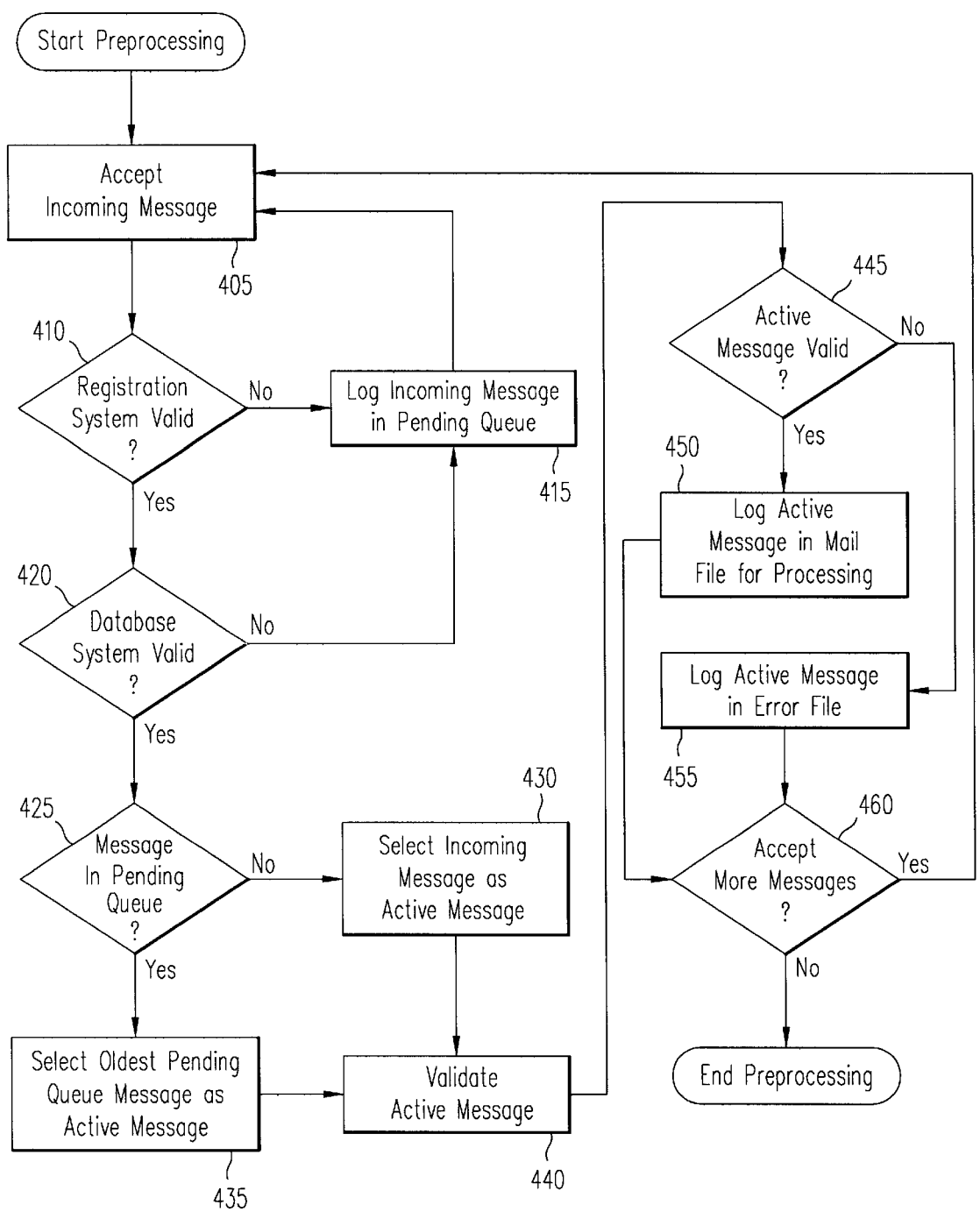
FIG. 4 shows a flow chart of an embodiment of a message processing module of an electronic business transaction module according to an embodiment of the invention.

FIG. 3 shows the functionality of the customer request processing module 210. A customer request for access is received at step 310. Control then transitions to identify nature of customer step 320. During step 320, the customer submitting the request is identified as a new customer or an already registered customer. If the customer is a new customer, control transitions to register customer as client step 340. If the customer is already registered as a client, control transitions to login client step 330.

FIG. 4 shows the functionality of the preprocessing module 220. Incoming messages are accepted at step 405. Control then transitions to registration system validity check step 410. During step 410, the registration system is checked to see if it is ready to receive incoming messages. If the registration system is not ready to receive incoming messages, control transitions to log step 415. During log step 415, incoming messages are logged in a pending queue. After the message is logged, control transitions from log step 415 to step 405. If the registration system is ready, control transitions from registration system validity check step 410 to database check step 420. During database check step 420, the database system is checked to see if it is ready to receive incoming messages. If the database system is not ready, control transitions to log step 415. If the database system is ready, control transitions to queue check step 425. If a message is pending in the queue, control transitions to step 435 where the oldest pending message is selected as the active message which will be serviced. If a message is not pending in the queue, control transitions to step 430 where the next incoming message is selected as the active message. Control then transitions from either of steps 430 or 435 to step 440 wherein the active message is validated. Control transitions to step 450 if the active message is valid and to step 455 if the active message is invalid. During step 450, the active message is logged in a mail file for processing. During step 455, the message is logged into an error file. Control then transitions to step 460 where new messages may be accepted.

Figure 5:
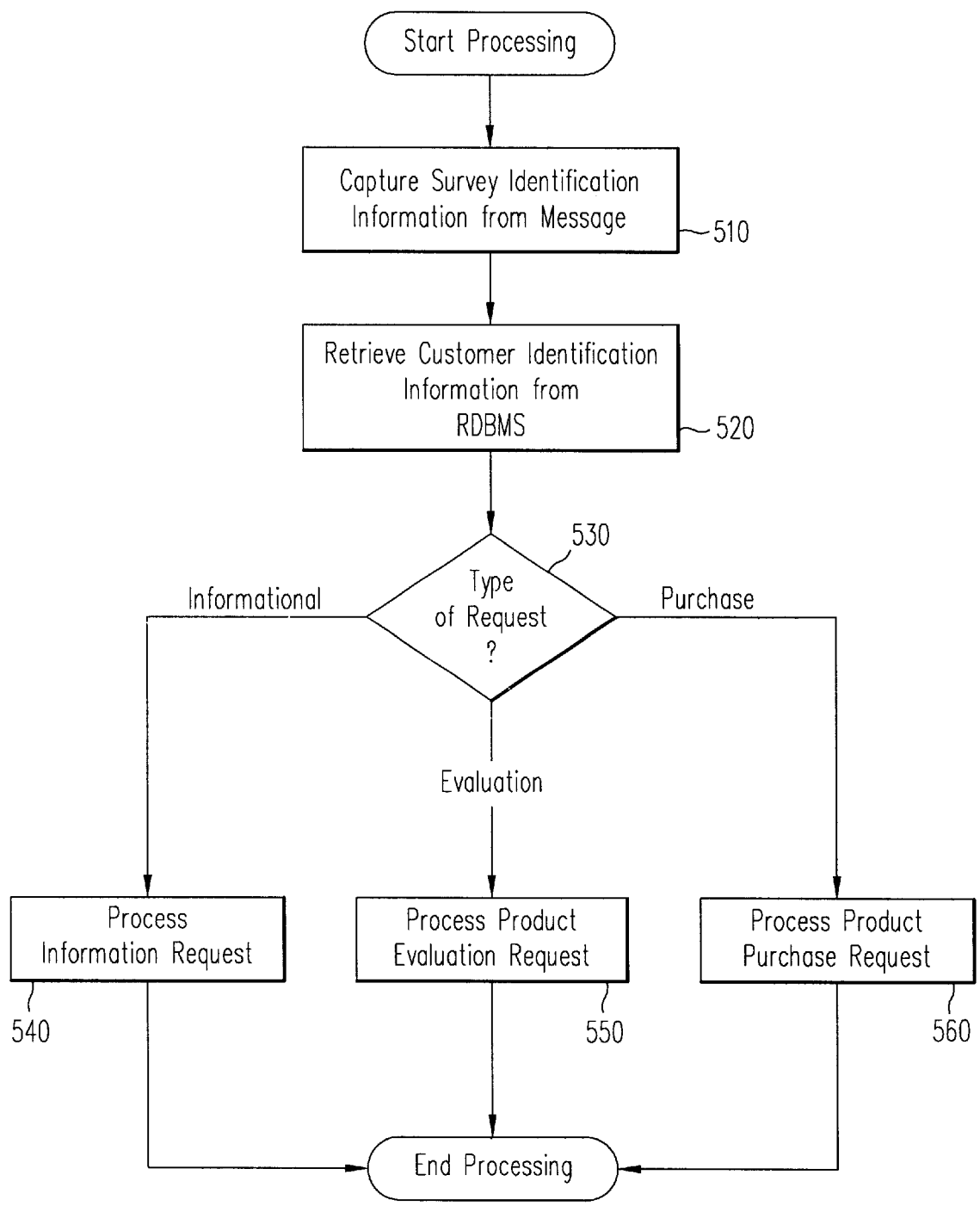
FIG. 5 shows a flow chart of an embodiment of a message processing module of an electronic business transaction module according to an embodiment of the invention.

FIG. 5 shows the functionality of preprocessing module 230. At capture step 510, survey identification information is captured from the active message. Survey identification information is provided by the customer in the active message. For example, after receiving and logging an active message as described above, HTTPD 122 accesses the active message to retrieve identification information provided by the customer.

Control then transitions to retrieve step 520. During retrieve step 520, customer identification information is retrieved from a database system. For example, HTTPD 122 accesses RDBMS 142 via CGI 123 to retrieve customer information corresponding to the customer that provided the active message.

Control then transitions to request classification step 530. During request classification step 530, the type of request conveyed by the active message is identified. For example, HTTPD 122 identified is the active message is for an information request, an evaluation request, or a product purchase request. An information request is a request for information regarding certain products or business practices. An evaluation request is a request for a product solely for the purposes of evaluating the product. A purchase request is a request for a product. For example, a customer may first request information and then request an evaluation of a product. After evaluating the product, the customer can purchase the product.

Control transitions from request classification step to one of three request processing steps 540, 550, 560 depending on the type of request. Control transitions to step 540 if the message includes an information request. Control transitions to step 550 if the message includes an evaluation request. Control transitions to step 560 if the message includes a product purchase request. During step 540, the information request is processed according to the steps of FIG. 6. During step 550, the evaluation request is processed according to the steps of FIG. 7. During step 560, the purchase product request is processed according to the steps of FIG. 8.

Figure 6:
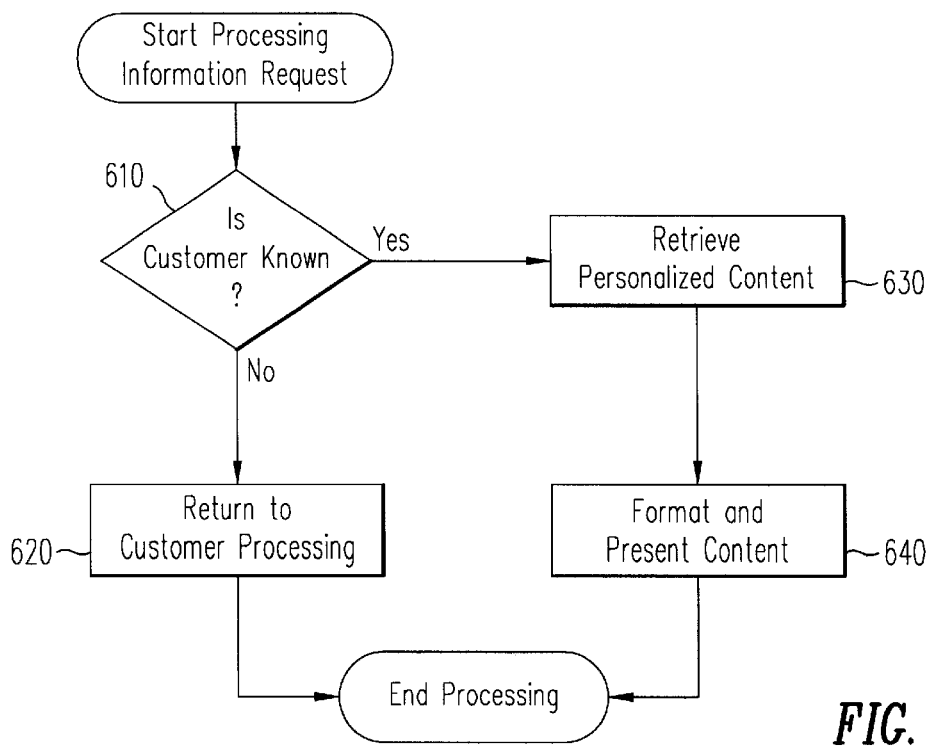
FIG. 6 shows a flow chart of an embodiment of an information message processing module of an electronic business transaction module according to an embodiment of the invention.

FIG. 6 shows the functionality of the information request module 540. During customer identification step 610, the EBTS determines if the customer is known. For example, the customer identification information provided in the active message by the customer is compared to the customer identification information retrieved from the RDBMS to determine if the customer is registered. If the customer is not registered, control transitions to return to customer processing step 620. That is, if the customer is not known, the customer processing module of FIG. 3 is accessed to register the customer as a client. If the customer is known to the EBTS, control transitions from step 610 to retrieve personalized content step 630. During retrieve personalized content step 630, customer information stored in the RDBMS is retrieved by the HTTPD 122 via CGI 123. Control then transitions to format and present content step 640. During format and present content step 640, the personalized customer information is combined with the requested information to provide a stateful presentation to the client.

Figure 7:
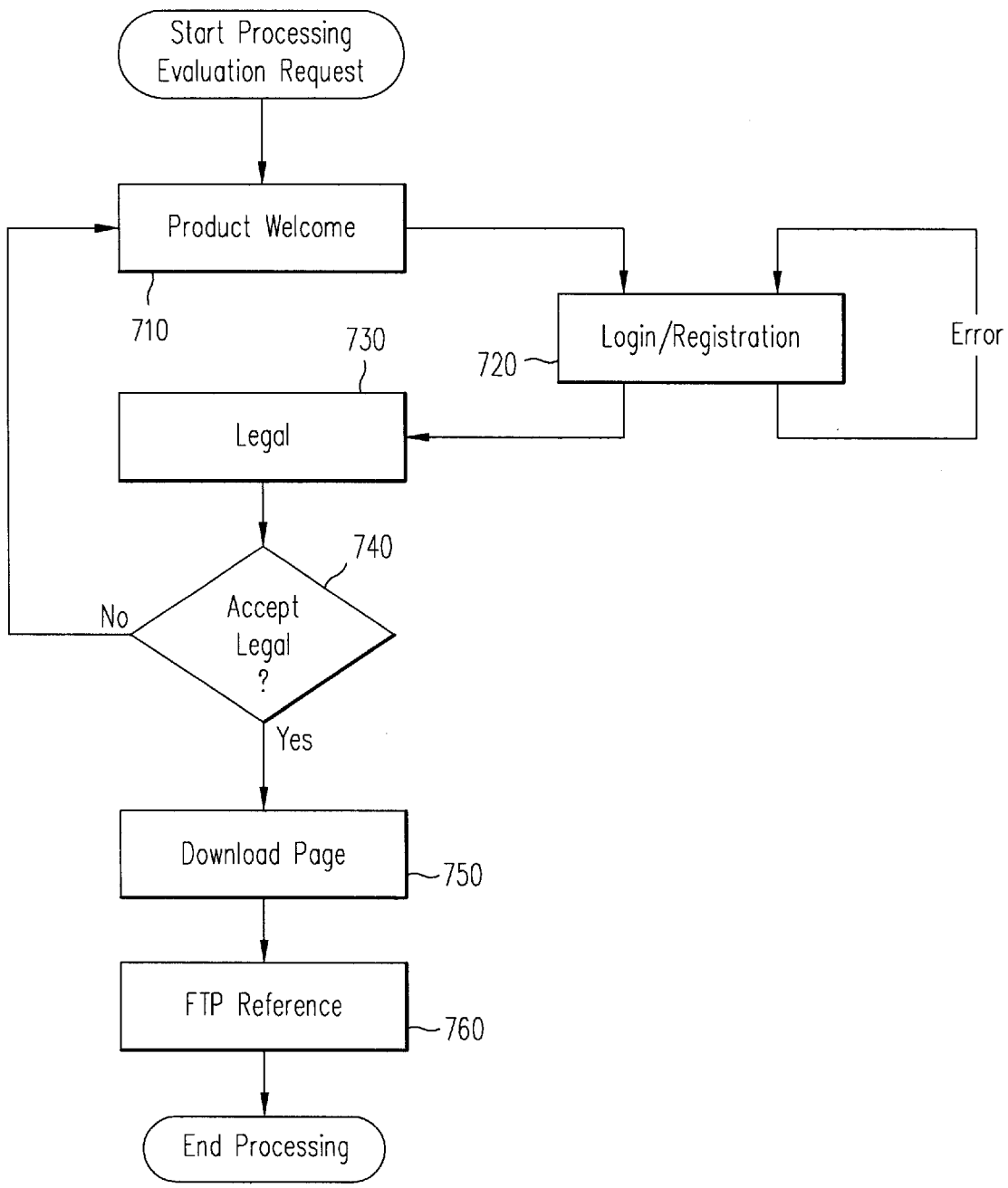
FIG. 7 shows a flow chart of an embodiment of an evaluation message processing module of an electronic business transaction module according to an embodiment of the invention.

FIG. 7 shows the functionality of the evaluation request module 550. At welcome step 710, a product welcome is presented to a customer requesting a product evaluation. Control then transitions to login/registration step 720 where the customer is identified and registered and/or logged in if necessary. In one embodiment, during login/registration step 720, customer identification step 610 is performed. If the customer is not known, customer processing step 620 is performed. If the customer is known, control transitions to legal step 730. During legal step 730, an evaluation legal agreement is provided to the customer.

Control then transitions to accept legal step 740. During accept legal step 740, the customer is provided the opportunity to accept the license required to obtain the product to be evaluated. The evaluation legal agreement must be accepted for the evaluation to proceed, and the particular version of the legal agreement accepted by the customer is preferably tracked and logged in a database system.

Control then transitions to download page step 750. During download page step 750, the link for downloading the product is provided to the customer. For example, HTTPD 122 provides a link and a ticket (obtained from RDBMS 142) to FTPD 132 so that the customer can download the product from FTPD 132. Control then transitions to FTP reference step 760. During FTP reference step 760, the product is provided to the customer. For example, FTPD 132 provides the product to a customer using web browser 112 or web browser 162.

Figure 8:
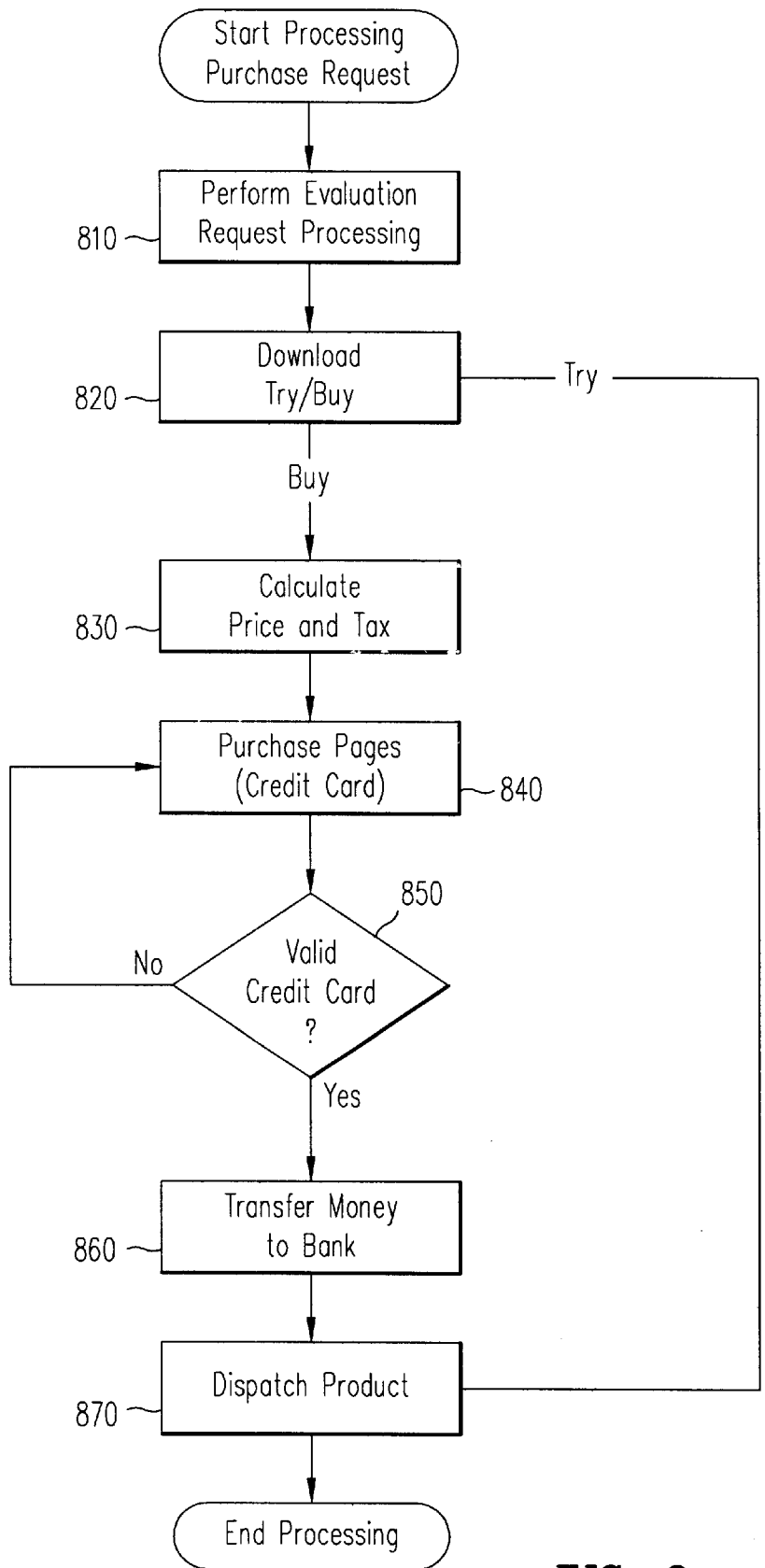
FIG. 8 shows a flow chart of an embodiment of a purchase message processing module of an electronic business transaction module according to an embodiment of the invention.

FIG. 8 shows the functionality of the purchase request module 560. At perform evaluation request processing step 810, the steps for preparing for a product download for evaluation are performed regarding a product download for purchase. For example, the product welcome is presented to a customer requesting a product purchase, and the customer is identified and registered and/or logged in if necessary. Furthermore, the customer is provided an opportunity to accept the license required to purchase the product in question. The product purchase legal agreement must be accepted for the purchase to proceed, and the particular version of the legal agreement accepted by the customer is preferably tracked and logged in a database system.

In the embodiment of FIG. 8, the download page has a try/buy option to allow the customer to choose to try (evaluate) the product or to buy (purchase) the product. If the customer selects "try," control transitions to dispatch product step 870 where the customer is provided a link for downloading the product. For example, HTTPD 122 provides a link and a ticket to FTPD 132 so that the customer can download the product from FTPD 132. For example, responsive to the link being accessed and the ticket being verified, FTPD 132 provides the product to a customer using web browser 112 or web browser 162.

If the customer selects "buy," control transitions to calculation step 830. During calculation step 830, the price and tax are calculated. For example, HTTPD 122 accesses RDBMS 142 via CGI 123 to obtain customer information to determine the tax and any special pricing arrangements that may apply and provides a personalized bill to the customer.

Control then transitions to purchase step 840 where the customer is prompted to supply payment information such as credit card information. Control then transitions to validation step 850 where the payment information is verified. If the payment information is invalid or unacceptable, control transitions to purchase step 840 so the payment information may be reentered. If the payment information is valid, control transfers to transfer step 860. During transfer step 860, the payment information is used to complete payment for the product. Upon completion of payment of the product, the product is dispatched at step 870, discussed above.

Figure 9:
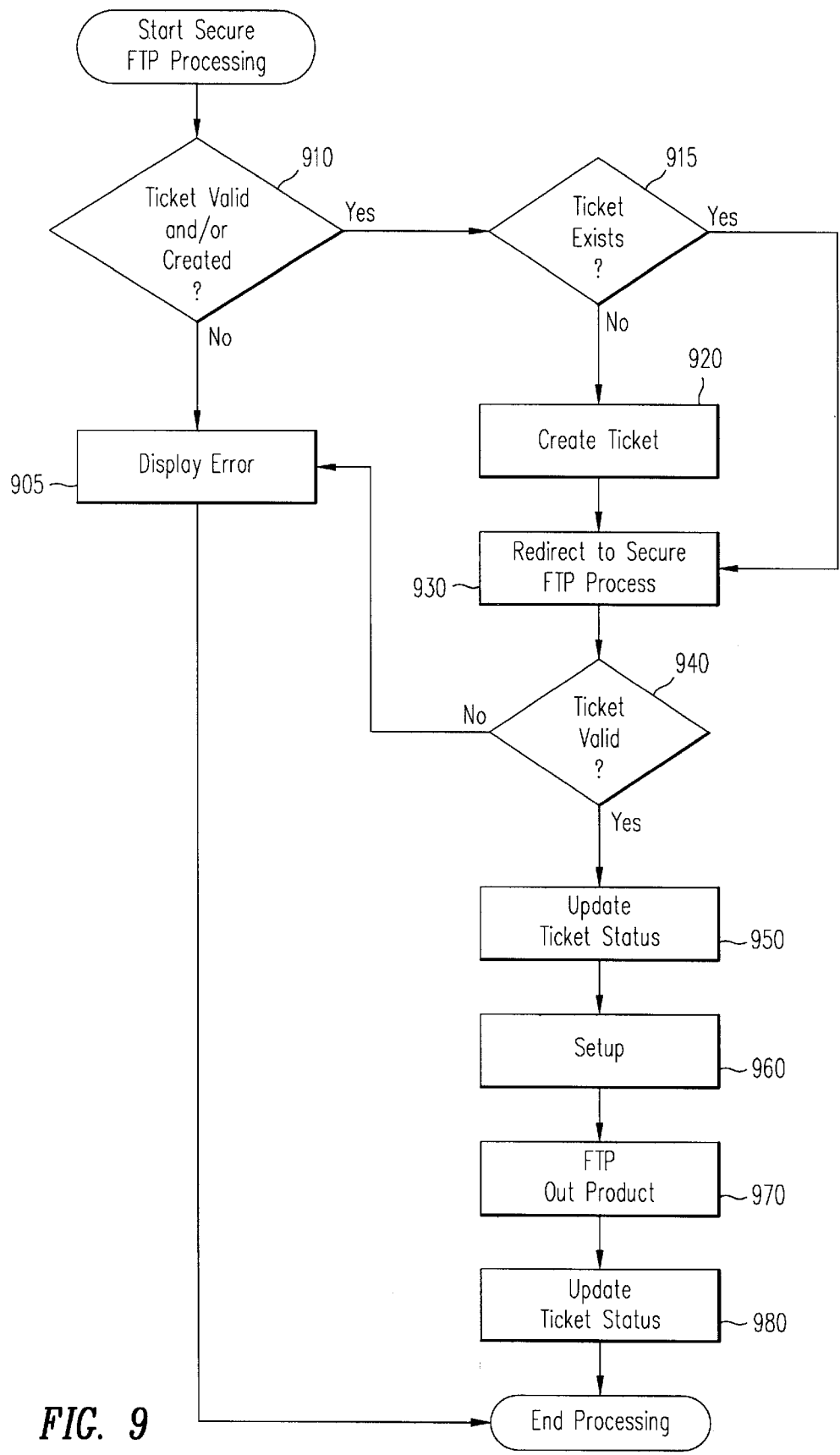
FIG. 9 shows a flow chart of an embodiment of a secure FTP ticketing module of an electronic business transaction module according to an embodiment of the invention.

FIG. 9 shows the FTP process of an embodiment of the EBTS. At step 910, the state of a ticket is determined. For example, HTTPD 122 communicates with RDBMS 142 to determine if a ticket has been created and/or if the ticket is valid. If the ticket is not created or valid, control transitions to error step 905. At error step 905, an error message is displayed. For example, CGI 123 communicates an error to HTTPD 122 which displays an error message to the customer on web browser 112. If the ticket has been created and is valid, control transitions to step 915. During step 915, the continued existence of the ticket is determined. CGI 123 communicates to RDBMS 142 to determine the existence of the ticket. If the ticket does not exist, control transitions to step 920 where a ticket is created, for example, by CGI 123 in RDBMS 142. Control then transitions to redirect step 930. If the ticket does exist, control transitions from step 915 to redirect step 930. During redirect step 930, the customer is given the ticket and is redirected to a secure FTP process. For example, HTTPD 122 receives the ticket from CGI 123 and redirects the customer to secure FTPD 132.

Control then transitions to step 940. During step 940, the validity of the ticket communicated to the secure FTPD is checked. For example, FTPD 132 communicates to RDBMS 142 via HTTPD 122 and CGI 123 to determine if the ticket presented to FTPD 132 is valid. Once properly created and assigned, the ticket remains valid for a time or for a number of tries by the customer to download the product and/or information. If the ticket is not valid or is no longer valid, control transitions to error step 905. If the ticket is valid, control transitions to update step 950. During update step 950, the status of the ticket is updated. For example, FTPD 132 communicates to RDBMS 142 via HTTPD 122 and CGI 123 to update the status of the ticket. Control then transitions to setup step 960. During setup step 960, any necessary setup is performed to prepare to transfer the product and/or information to the customer. For example, FTPD 132 designates the product directory as the active directory (e.g., changes directory to the product directory), and changes root. Control then transitions to transfer step 970. During transfer step 970, the product and/or information is transferred to the client. For example, FTPD 132 transfers the product and/or information to the client on web browser 112 by using the secure file transfer protocol. Control then transitions to update step 980 where the status of the ticket is updated. For example, a "try" by the client may be registered, or a successful download may be noted, thereby invalidating the current ticket. If an error occurs or if a download attempt is completed, processing ends.

In one embodiment, the EBTS has an execution environment including the Tool Command Language (TCL) and the Sybase TCL Extension, a security environment including various means of encryption and a secure FTPD, a persistent data store (Sybase) and a financial environment for manipulation of cyber cash. The application is readily extendible based on the open interfaces and runs behind any CGI compliant web server (e.g., Sun WebServer, Apache, Netscape) and displays pure HTML 3.2 compliant content which most browsers support (e.g., HotJava, Netscape Communicator, Microsoft Internet Explorer, Mosaic). An exemplary system includes HTTPD (Sun WebServer), application (SybTcl 2.4; Perl 5.0), RDBMS (Sybase SQL Server 11), FTPD (Solaris FTPD with additional "geturl" code, additional MD5 encryption, and removal of most FTP commands), encryption (RC4; MD5), client interface (HTML 3.2; CGI), and commerce (AVP verazip; AVP taxcalc; cyber cash 2.x). Maintaining the database behind a firewall provides for timely information access and update in addition to data replication to backup and reporting systems.

While the invention has been described with reference to various embodiments, it will be understood that these embodiments are illustrative and that the scope of the invention is not limited to them. Many variations, modifications, additions, and improvements of the embodiments described are possible. For example, although the functionality has been described in relation to specifically identified computer processes such as HTTPD 122, CGI 123, FTPD 132 and RDBMS 142, other embodiments may include any type or combination of network server processes, server-side resource processes, file transfer processes and database systems.

Also, those skilled in the art will recognize that although the functions of the above referenced modules are performed by software modules in the present embodiment, other types of modules may be used such as application specific hardware modules or otherwise configured hardware modules. Furthermore, the boundaries between modules are merely illustrative and alternative embodiments may merge modules or impose an alternate decomposition of functionality of modules. Alternative embodiments may combine multiple instances of a particular module. The operational steps given in the exemplary embodiment are for illustration only and may be combined in fewer steps or distributed in additional steps in accordance with the invention. These and other variations, modifications, additions, and improvements may fall within the scope of the invention as defined in the claims which follow.

What is claimed is:

1. A method for transacting business electronically, the method comprising:

storing first information in a database management module in a protected environment, the first information including client information and product information;

reading the first information in the database management module by a network server module in response to a client request, the network server module being outside the protected environment, the network server module distributing both secure and non-secure information, wherein at least a portion of the first information is encrypted, the first information providing login information relating to the client;

providing a client customized interface using the first information by the network server module;

in response to a request by a client for a secure selected data file, providing the client with a ticket file and providing the selected data file to the file transfer module, the file transfer module being outside the protected environment, a file transfer module having a secure file transfer protocol;

in response to the receipt of the ticket file by the file transfer module from the client, determining when the client is authorized to receive the selected data file in the file transfer module by comparison of the ticket file from the client with a ticket file stored in the database management module; and when the client is authorized to receive the selected data file, transferring the selected data file to the client by the file transfer module using the secure file transfer protocol.

2. The method as recited in claim 1 further comprising the step of encrypting the selected data file by the network server module.

3. The method as recited in claim 1 wherein files in the database management module are protected by at least one of: a firewall, encryption procedures in the network server module, and a file transfer module using the secure file transfer protocol.

4. The method as recited in claim 1 wherein files in the database management module are protected by a firewall, encryption procedures in the network server, and a file transfer module using the secure file transfer protocol.

5. The method as recited in claim 1 wherein the client request for selected data files includes at least one of: a request for product information, a request for product evaluation, and a product purchase request.

6. The method as recited in claim 5 wherein, in response to a client request for product evaluation, the method further comprising:

implementing a login procedure for the client, the login procedure including
accessing the first information;
forwarding an agreement to the client; and
when the client has executed the agreement, making the product evaluation available to the client.

7. The method as recited in claim 5, wherein in response to a client request for a product purchase, the method comprising:

implementing a login procedure for the client, the login procedure including accessing the first information;
forwarding an invoice to the client;
confirming payment by the client; and
making the requested product available to the client.

8. The method as recited in claim 7 wherein the making the requested product available includes at least one of:

encrypting the requested product; and
transferring the requested product by the file transfer module.

9. The method as recited in claim 1 wherein the determining when the client is authorized step includes:

comparing at least one client password with a password stored in the database management module.

10. The method as recited in claim 1 wherein the network server module has a separate interface for interacting with the data base management system.

11. An apparatus for electronically, securely and statefully transacting business, the apparatus comprising:

computer-readable storage media, the storage media being in a protected environment;

a database management module stored on the computer-readable storage media, the database management module storing at least first information and secure data files;

a network server module outside the protected environment, the network server module including:
  a client interface module;
  a secure database interface module for interacting with the database management module; and
  a file transfer interface module; and a file transfer module outside of the protected environment, the file transfer module having a secure file transfer protocol; and wherein
  the client interface module accesses the database interface module in response to an access by a client;
  the database interface module provides the first information to the client interface module responsive to being accessed by the client interface module, the first information used in a login procedure with the client;
  the client interface module provides an interface that is customized to the client in response to receiving the first information from the database interface module;
  the file transfer interface module providing a selected data file to the file transfer module in response to a request for selected data files, the client interface module providing a ticket file to the client when the selected data file is a secure data file;
  in response to receiving the ticket file from the client, a comparison of the ticket file from the client with the ticket file in the database management system is performed, and
  when the comparison is true, the file transfer module transfers the selected file using the secure file transfer protocol to the client.

12. The apparatus as recited in claim 11 wherein the network server module includes procedures for encrypting files from the database management module.

13. The apparatus as recited in claim 12, the protected environment including:

a firewall, wherein files in the database management module are protected by the firewall, the procedures for encrypting the files, and the file transfer module using the secure file transfer protocol.

14. The apparatus as recited in claim 11 wherein access by a client can include a data file selected from the group comprising a request for product information, a request for product evaluation, and a product purchase request.

15. The apparatus as recited in claim 14 wherein an agreement is transferred to the client by the network server module in response to a product evaluation request.

16. The apparatus as recited in claim 14 wherein an invoice is transferred to the client by the network server module in response to a product purchase request.

17. The apparatus as recited in claim 11 wherein the ticket file includes at least one password, the at least one password in the database management module being compared with a client password prior to the product being transferred to the client.

18. The apparatus as recited in claim 17 wherein the one password is applied to the file transfer module, the one password being transferred to the file transfer interface module for comparison.

19. An apparatus for providing protected information to a client system over a network, the apparatus comprising:

a database system storing product files and client files, the database system being in a protected environment, wherein some of the files are protected;

a network server responsive to the client system, the network server not being in the protected environment, wherein a client request for product files causes product files and client files to be transferred from the database system, client files permitting the network server to implement a login procedure for the client, the network server preparing customized responses to the client system from the client files, the network server determining a category of activity for responding to the client, wherein the requested non-protected client files are transferred to the client, the network server including encryption procedures for encrypting files;

a file transfer server outside of the protected environment for receiving selected files, wherein non-protected selected files are transferred to the client after the login procedure; wherein protected selected files are transferred using a secure file transfer protocol in response to a ticket file provided to the client system by the network server after validation of the ticket file by the network server, a protected selected file being transferred to the client system when at least one portion of a client ticket file matches a ticket file in the database system during the login procedure.

20. The apparatus as recited in claim 19 wherein the protected environment includes a firewall, the database management module being internal to the firewall, the client system, the network server and the file transfer system being external to the firewall.

21. The apparatus as recited in claim 19 wherein the protected selected files transferred from the file transfer server to the client system are encrypted.

22. The apparatus as recited in claim 19, wherein the validation is provided for a product evaluation request upon completion of the login and execution of a legal agreement, and wherein validation is provided for a product purchase request after payment has been verified.

* * * * *

UNITED STATES PATENT AND TRADEMARK OFFICE
CERTIFICATE OF CORRECTION

PATENT NO.   : 6,463,418 B1
DATED        : October 8, 2002
INVENTOR(S)  : James W. Todd It is certified that error appears in the above-identified patent and that said Letters Patent is hereby corrected as shown below:

Column 14,
Line 15, after "environment" please delete "a" and insert -- the --.

Column 16,
Line 12, after "the" please insert -- at least --.
Line 13, after "the" (second occurrence) please insert -- at least --.

Signed and Sealed this

Twelfth Day of August, 2003

JAMES E. ROGAN
*Director of the United States Patent and Trademark Office*